US010675938B2

(12) United States Patent
Jung et al.

(10) Patent No.: US 10,675,938 B2
(45) Date of Patent: Jun. 9, 2020

(54) AIR CONDITIONER FOR VEHICLE AND CONTROLLING METHOD THEREOF

(71) Applicant: HANON SYSTEMS, Daejeon (KR)

(72) Inventors: Jae O. Jung, Daejeon (KR); Seok Kim, Daejeon (KR); Young In Kim, Daejeon (KR); Yong Sik Kim, Daejeon (KR); Seung Sik Won, Daejeon (KR); Jun Min Lee, Daejeon (KR); Jung Won Cho, Daejeon (KR)

(73) Assignee: HANON SYSTEMS, Daejeon (KR)

(*) Notice: Subject to any disclaimer, the term of this patent is extended or adjusted under 35 U.S.C. 154(b) by 620 days.

(21) Appl. No.: 15/316,864

(22) PCT Filed: Dec. 11, 2015

(86) PCT No.: PCT/KR2015/013566
§ 371 (c)(1),
(2) Date: Dec. 7, 2016

(87) PCT Pub. No.: WO2016/099080
PCT Pub. Date: Jun. 23, 2016

(65) Prior Publication Data
US 2017/0096045 A1  Apr. 6, 2017

(30) Foreign Application Priority Data

Dec. 17, 2014 (KR) .................... 10-2014-0182335
Dec. 19, 2014 (KR) .................... 10-2014-0184649

(51) Int. Cl.
B60H 1/00 (2006.01)

(52) U.S. Cl.
CPC ....... B60H 1/00028 (2013.01); B60H 1/0005 (2013.01); B60H 1/00471 (2013.01);
(Continued)

(58) Field of Classification Search
CPC .............. B60H 1/0065; B60H 1/00528; B60H 1/00028; B60H 1/00514
See application file for complete search history.

(56) References Cited

U.S. PATENT DOCUMENTS 4,664,551 A * 5/1987 Poitier ............... B60H 1/00528
403/335
6,383,071 B1 * 5/2002 Takeuchi ........... B60H 1/00842
454/121
(Continued)

FOREIGN PATENT DOCUMENTS

CN 102381153 A 3/2012
CN 104015588 A 9/2014
(Continued)

OTHER PUBLICATIONS

Machine translation of CN104015588, titled CN 104015588MT, patent provided by applicant in IDS (Year: 2014).*
(Continued)

Primary Examiner — Steven B Mcallister
Assistant Examiner — Elizabeth M. May
(74) Attorney, Agent, or Firm — Dickinson Wright PLLC

(57) ABSTRACT

Disclosed is an air conditioner for a vehicle and a controlling method thereof. The air conditioner includes: a defrost vent and a face vent formed in a straight line; a defrost door part and a face door part formed in a straight line; and a duct separator having the defrost door part therein and being mounted inside an outlet, in which the defrost vent and the face vent are formed, to partition the defrost vent and the face vent, thereby enhancing assemblability by facilitating assembly even if the defrost door part and the face door part are mounted at different angles. Moreover, the air conditioner and the controlling method thereof can control an air outflow mode and an air inflow mode to be operated in interwork by connecting a first operating member for oper- (Continued)

ating a mode door and a second operating member for operating an intake door with each other.

16 Claims, 15 Drawing Sheets

(52) U.S. Cl.
CPC ..... *B60H 1/00514* (2013.01); *B60H 1/00678* (2013.01); *B60H 1/00685* (2013.01); *B60H 1/00842* (2013.01); *B60H 2001/00092* (2013.01)

(56) References Cited

U.S. PATENT DOCUMENTS

| | | | |
|---|---|---|---|
| 9,724,977 B2 | 8/2017 | Ju et al. | |
| 2012/0057972 A1* | 3/2012 | Kim | B60H 1/00507 415/204 |
| 2015/0306935 A1 | 10/2015 | Shichiken et al. | |

FOREIGN PATENT DOCUMENTS

| | | | | |
|---|---|---|---|---|
| DE | 19817896 A1 | * | 11/1998 | ......... B60H 1/00685 |
| DE | 10126390 A1 | | 12/2002 | |
| JP | 2005178544 A | | 7/2005 | |
| KR | 20110065138 A | | 6/2011 | |
| KR | 1020110087084 A | | 8/2011 | |
| KR | 20110126230 A | | 11/2011 | |
| KR | 20120138927 A | | 12/2012 | |
| KR | 20130124685 A | | 11/2013 | |
| KR | 20140073172 A | | 6/2014 | |
| KR | 20140115537 A | | 10/2014 | |

OTHER PUBLICATIONS

International Search Report and Written Opinion dated Feb. 23, 2016 from International Patent Application Serial No. PCT/KR2015/013566, with English translation of International Search Report.

* cited by examiner

PRIOR ART

PRIOR ART

PRIOR ART

AIR CONDITIONER FOR VEHICLE AND CONTROLLING METHOD THEREOF

CROSS-REFERENCE TO RELATED APPLICATIONS

This application is a U.S. National Stage of International Application No. PCT/KR2015/013566, filed Dec. 11, 2015, which claims the benefit and priority of KR 10-2014-0182335 filed Dec. 17, 2014 and KR 10-2014-0184649 filed Dec. 19, 2014. The entire disclosures of each of the above applications are incorporated herein by reference.

BACKGROUND OF THE INVENTION

Field of the Invention

The present invention relates to an air conditioner for a vehicle and a controlling method thereof, and more particularly, to an air conditioner for a vehicle which includes a defrost vent and a face vent formed in a straight line, a defrost door part and a face door part formed in a straight line, a duct separator having the defrost door part therein and being mounted inside an outlet, in which the defrost vent and the face vent are formed, to partition the defrost vent and the face vent, and a connection member for connecting a first operating member for operating mode doors with a second operating member for operating an intake door so as to control the first operating member and the second operating member to interwork each other, and a controlling method thereof.

Background Art

An air conditioner for a vehicle is an apparatus for cooling or heating the interior of the vehicle by cooling or heating through the process of introducing outdoor air into the interior of the vehicle or circulating indoor air of the vehicle. Such an air conditioner for a vehicle includes an evaporator for cooling the inside of an air-conditioning case; a heater core for heating the inside of the air-conditioning case; and a mode converting door for selectively blowing the air cooled by the evaporator or heated by the heater core toward parts of the interior of the vehicle.

According to independent structures of a blower unit, an evaporator unit and a heater core unit, such an air conditioner is classified into a three-piece type air conditioner in which the blower unit, the evaporator unit and the heater core unit are disposed independently, a semi-center type air conditioner in which the evaporator unit and the heater core unit are embedded in the air-conditioning case and the blower unit is mounted separately, and a center-mounting type air conditioner in which the three units are all embedded in the air-conditioning case.

In order to increase effectiveness of the interior space of a vehicle, compact-sized and miniaturized air conditioners for vehicles are being demanded. In response to such demand, recently, development of a center-mounting type air conditioner in which a blower unit, an evaporator unit and a heater core unit are integrated is being promoted. As an example, such a center-mounting type air conditioner for a vehicle is illustrated in FIGS. 1 to 3.

The center-mounting type air conditioner 1 illustrated in FIGS. 1 to 3 includes: an air-conditioning case 10 in which a blower 20 is mounted at an inlet and a plurality of air outflow ports 12a to 12e formed at an outlet thereof; an evaporator 2 and a heater core 3 embedded in the air-conditioning case 10; one or more temperature-adjusting doors 14 for adjusting the degree of opening of a cold air passageway P1 and a warm air passageway P2 inside the air-conditioning case 10; and a plurality of mode doors 13 for adjusting the degree of opening of the air outflow ports 12a to 12e.

Moreover, the blower 20 includes: a scroll case 21 disposed at the inlet of the air-conditioning case 10; a centrifugal fan 25 rotatably mounted inside the scroll case 21; an intake duct 30 which is mounted at one side of the scroll case 21 and has inside and outside air inflow ports 31 and 32, which are opened and closed by an intake door 33; an inlet ring 22 which is formed at one side of the scroll case 21 facing the intake duct 30 to guide the air induced through the inside and outside air inflow ports 31 and 32 toward the inside of the centrifugal fan 25; and a motor 27 mounted on the opposite side of the inlet ring 22 of the scroll case 21 to operate the centrifugal fan 25.

Moreover, an air filter 35 is mounted inside the intake duct 30 in order to remove foreign matters contained in the air.

Furthermore, a plurality of the mode doors 13 are formed in a flat type or a center pivot type to adjust the degree of opening of the air outflow ports 12a to 12e (in the drawings, two mode doors are mounted).

Additionally, parts, such as a cam 15, an arm 16 and a control cable 17, are mounted on the outer face of the air-conditioning case 10 to operate the mode doors 13.

The cam 15 has a plurality of slots 15a in response to the number of the mode doors 13 to be operated and is connected with the control cable 17 so as to be rotated at a predetermined angle when the control cable 17 moves forward or backward.

The arm 16 is directly connected with a rotary shaft of each mode door 13 and is slidably combined with the slot 15a of the cam 15 through a pin 16a formed at an end portion thereof.

Therefore, when a passenger manipulates a controller inside the vehicle, the cam 16 rotates by the forward or backward movement of the control cable 17. When the cam 15 rotates, the arm 16 rotates at a predetermined angle by the pin 16a which slides along the slot 15a of the cam 15 so as to adjust the degree of opening of the mode door 13.

In addition, not shown in the drawing, but the intake duct 30 also has a cam, an arm and a control cable to operate the intake door 33.

When the centrifugal fan 25 inside the blower 20 is operated, low pressure is formed inside the centrifugal fan 25 by the rotation of the centrifugal fan 25. Therefore, air is inhaled in an axial direction of the centrifugal fan 25 through the inlet ring 22 and is blown in the radial direction of the centrifugal fan 25. The blown air is discharged to the inside of the air-conditioning case 10 through the outlet of the scroll case 21.

Continuously, the air discharged to the inside of the air-conditioning case 10 is cooled while passing through the evaporator 2, and then, bypasses the heater core 3 by the temperature-adjusting door to move in a cold air state or is heat-exchanged into warm air while passing through the heater core 3. After that, the air is discharged to the interior of the vehicle through the air outflow port 12 opened by the mode door according to air outflow modes so as to heat or cool the interior of the vehicle.

The air outflow port includes a defrost vent 12a, a face vent 12b and a floor vent 12e, and in this instance, the defrost vent 12a and the face vent 12b are arranged in forward and backward directions of the vehicle to partition each other.

In addition, the face vent 12b is partitioned into a center vent 12c in the middle and side vents 12d located at both sides.

The center vent 12c and the side vents 12d are divided from each other by a partition 12f formed inside the face vent 12b.

Therefore, the mode door 13 which opens and closes the face vent 12b includes: a center door part 13a for opening and closing the center vent 12c; and side door parts 13b for opening and closing the side vents 12d, and the center door part 13a and the side door parts 13b are formed coaxially.

The mode door 13 is assemblable in a state where the mode door 13 is arranged between a left case 10a and a right case 10b of the air-conditioning case 10.

However, the conventional air conditioner 1 has no problem in assembly if the center door part 13a and the side door parts 13b of the mode door 13 are formed at the same angle, but has a disadvantage in that it is impossible to assemble by the existing method if the center door part 13a and the side door parts 13b of the mode door 13 are formed at different angles in the rotational direction.

SUMMARY OF THE INVENTION

Accordingly, the present invention has been made in view of the above-mentioned problems occurring in the prior art, and it is an object of the present invention to provide an air conditioner for a vehicle which includes a defrost vent and a face vent formed in a straight line, a defrost door part and a face door part formed in a straight line, and a duct separator having the defrost door part therein and being mounted inside an outlet, in which the defrost vent and the face vent are formed, to partition the defrost vent and the face vent, thereby enhancing assemblability by facilitating assembly even if the defrost door part and the face door part are mounted at different angles.

It is another object of the present invention to provide an air conditioner for a vehicle and a controlling method thereof, in which a connection member connects a first operating member for operating mode doors with a second operating member for operating an intake door, thereby controlling an air outflow mode and an air inflow mode to interwork each other.

To accomplish the above object, according to the present invention, there is provided an air conditioner for a vehicle which includes: an air-conditioning case having an outlet having a defrost vent and face vents to discharge air induced from a blower; and a mode door mounted inside the air-conditioning case to adjust the degree of opening of the outlet, wherein the defrost vent and the face vent are formed in a straight line in the width direction of the vehicle, the mode door includes a defrost door part to adjust the degree of opening of the defrost vent and face door parts disposed in a straight line with the defrost door part to adjust the degree of opening of the face vents, and a duct separator which partitions the defrost vent and the face vents from each other and in which one of the defrost door part and the face door parts is arranged is disposed inside the outlet at which the defrost vent and the face vents are formed.

Because the defrost vent and the face vent are formed in a straight line, the defrost door part and the face door part are formed in a straight line and the duct separator which has the defrost door part therein is mounted inside an outlet, in which the defrost vent and the face vent are formed, to partition the defrost vent and the face vent, the air conditioner for a vehicle and the controlling method thereof according to the present invention can enhance assemblability by facilitating assembly even if the defrost door part and the face door part are mounted at different angles.

Moreover, the air conditioner for the vehicle and the controlling method thereof according to the present invention can reduce the number of manipulation by the passenger who wants to realize a wanted mode, reduce the number of components by reducing the number of the control cables and control the air outflow mode and the air inflow mode to interwork, because the connection member operates the first operating member and the second operating member in interwork by connecting a first operating member for operating mode doors with a second operating member for operating an intake door so as to allow the passenger to simultaneously control two doors by one control cable.

Furthermore, because the connection point of the connection member connected to the first lever is arranged to be closer to the rotation center of the cam than the connection point of the control cable connected to the second lever, the air conditioner for the vehicle and the controlling method thereof according to the present invention can provide easy manipulation by generating greater torque to transfer stronger power to the lever of the second operating member through the connection member when the control cable is manipulated.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
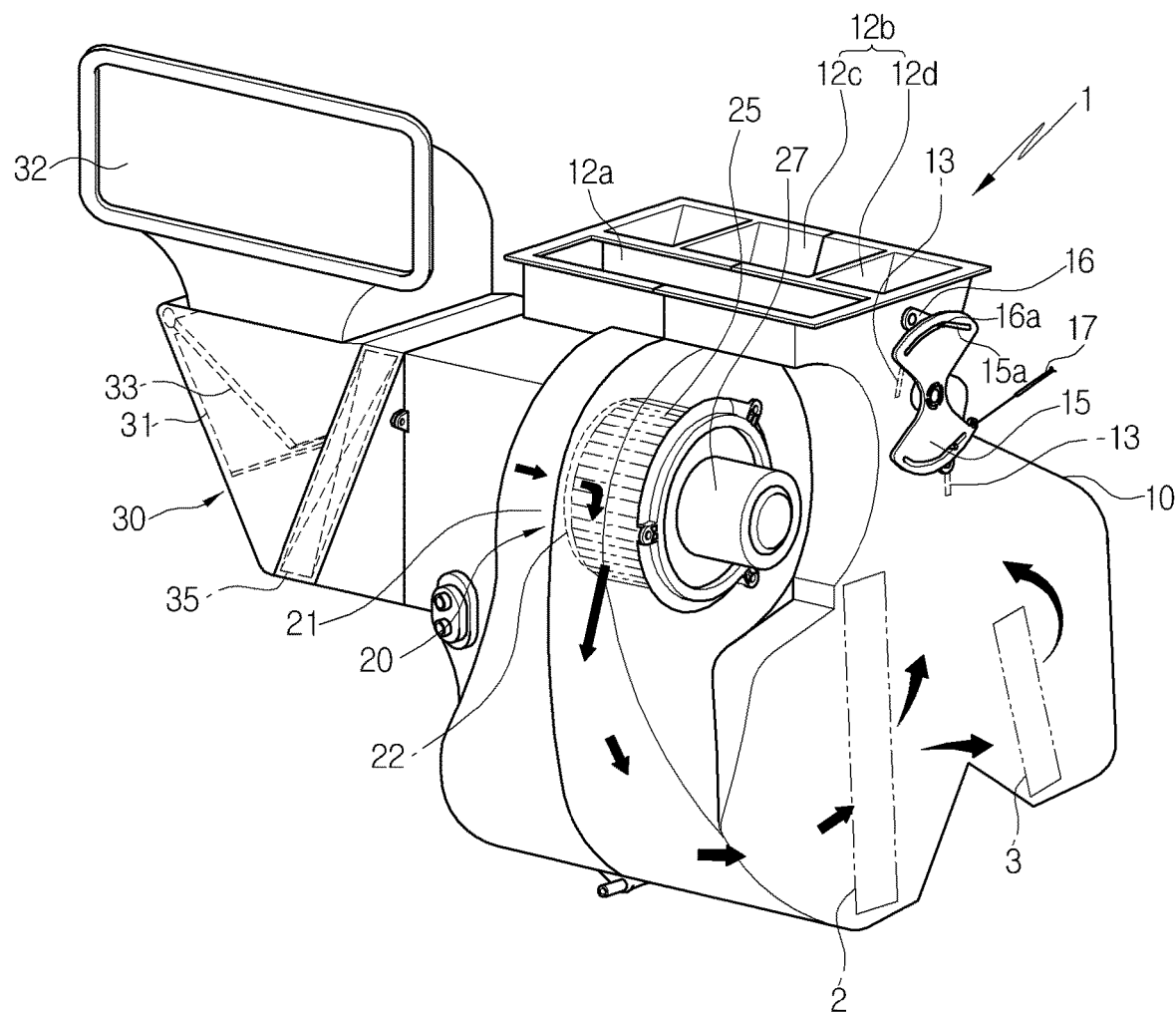
FIG. 1 is a perspective view showing a conventional air conditioner for a vehicle.
Figure 2:
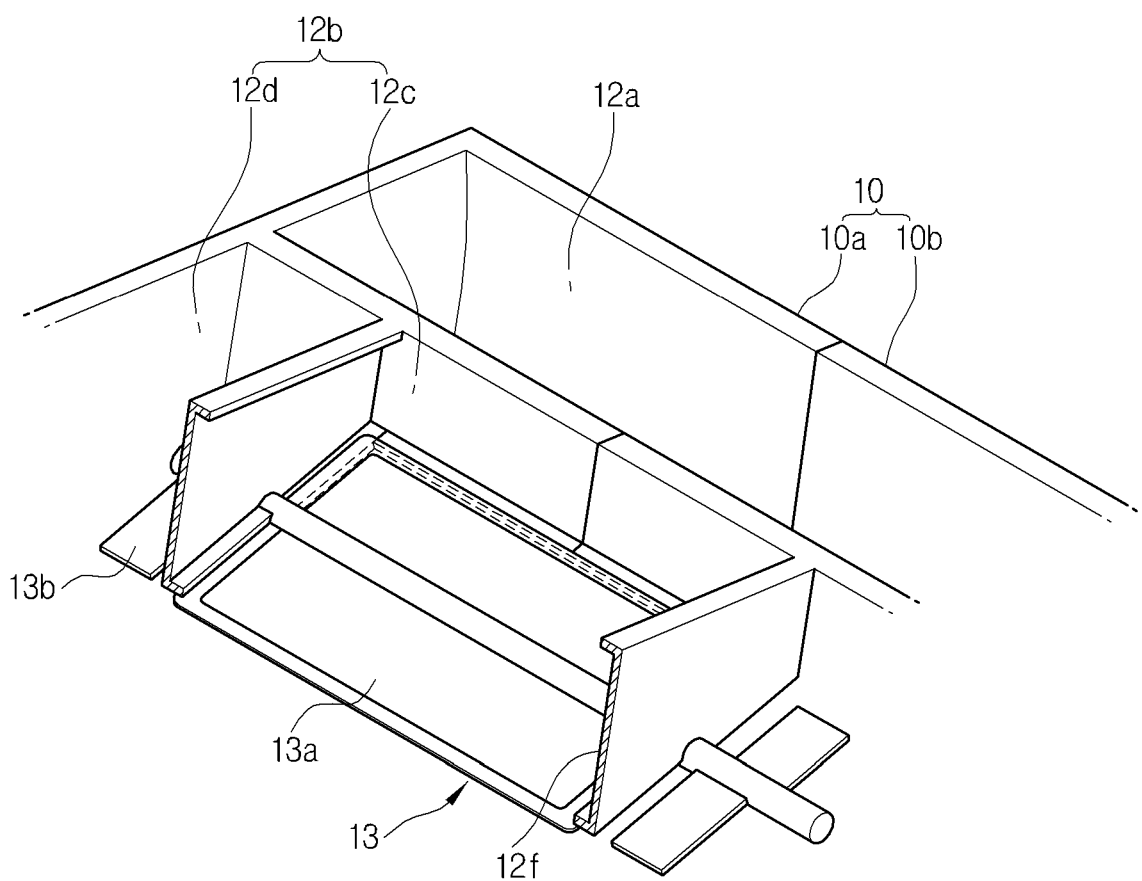
FIG. 2 is a partially perspective view showing a mode door mounted at a face vent of FIG. 1.
Figure 3:
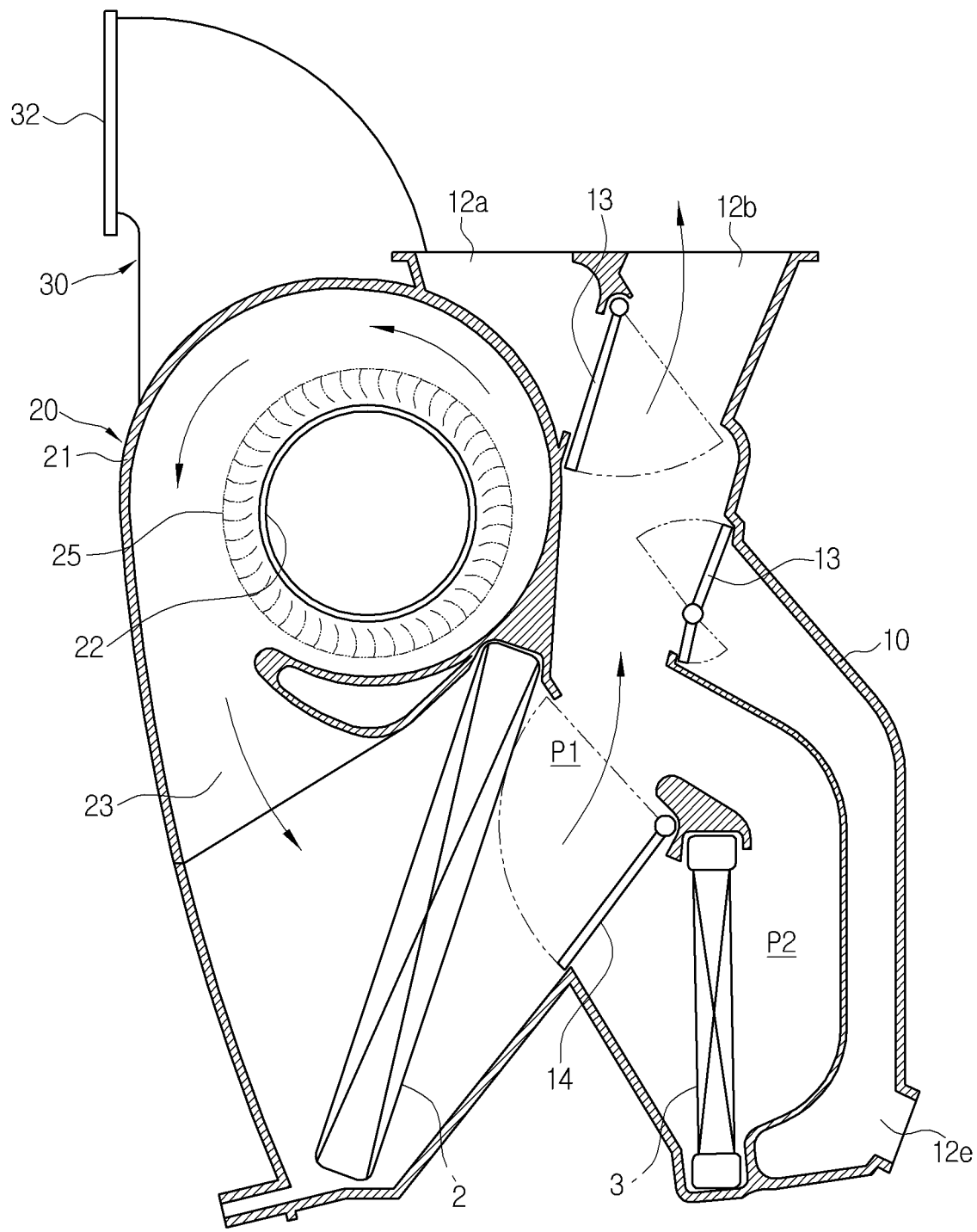
FIG. 3 is a sectional view of FIG. 1.

Reference will be now made in detail to the preferred embodiments of the present invention with reference to the attached drawings.

As shown in the drawing, an air conditioner 100 for a vehicle according to a preferred embodiment of the present invention includes: an air-conditioning case 110; a blower 130 disposed at an inlet 111 of the air-conditioning case 110; and an evaporator 101 and a heater core 102 mounted in an inside air passageway of the air-conditioning case 110.

The air-conditioning case 110 is constructed such that a left case 110a and a right case 110b are assembled with each other.

The inlet 111 of the air-conditioning case 110 is connected with an outlet 133 of the blower 130, and a plurality of outlets 112 are formed to discharge air to parts of the interior of the vehicle.

The outlet 112 includes: a defrost vent 112b and face vents 112a formed at an upper side of the air-conditioning case 110; and a floor vent 112c formed at a lower side of the air-conditioning case 110.

Figure 4:
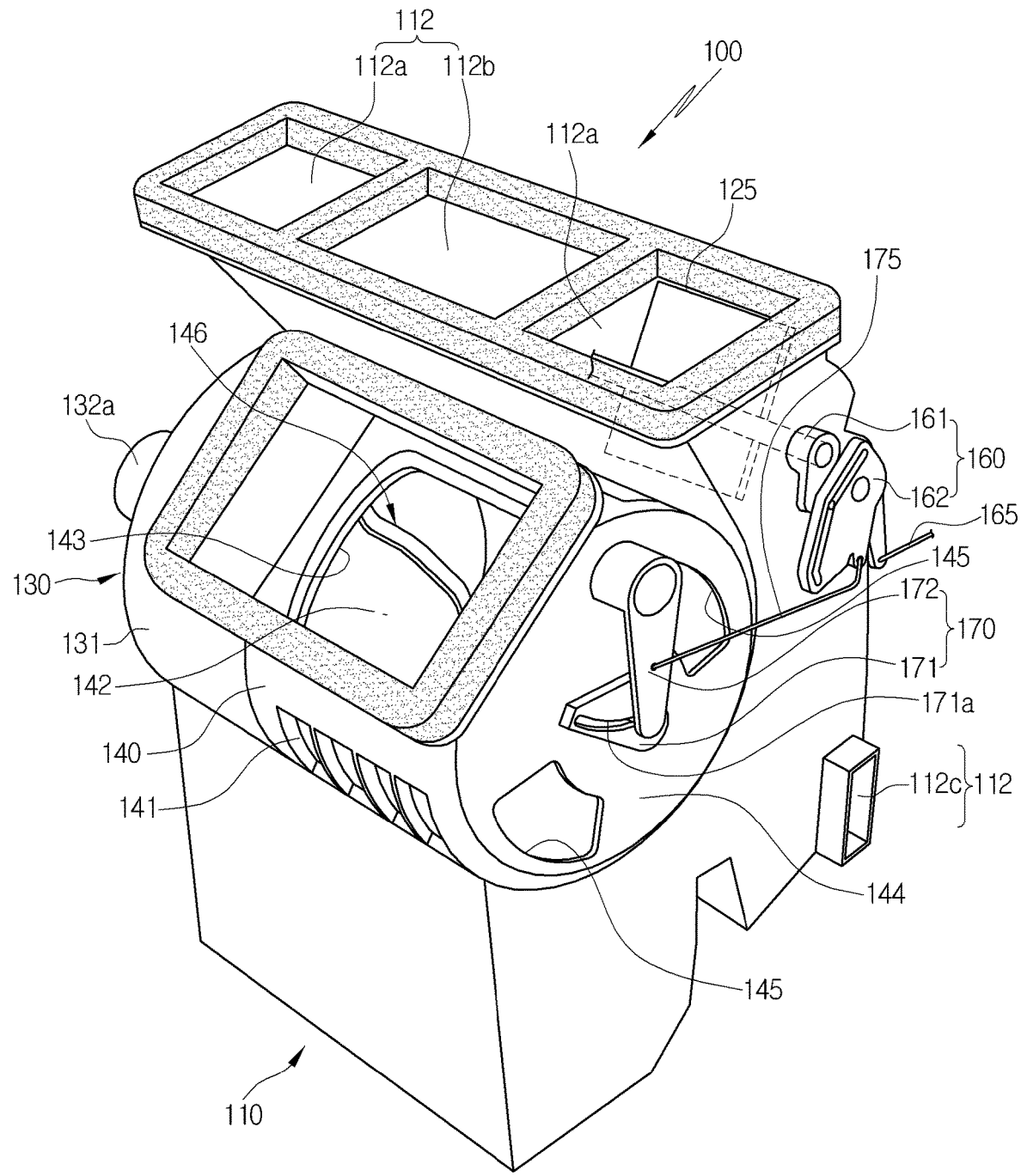
FIG. 4 is a perspective view showing an air conditioner for a vehicle according to the present invention.
Figure 5:
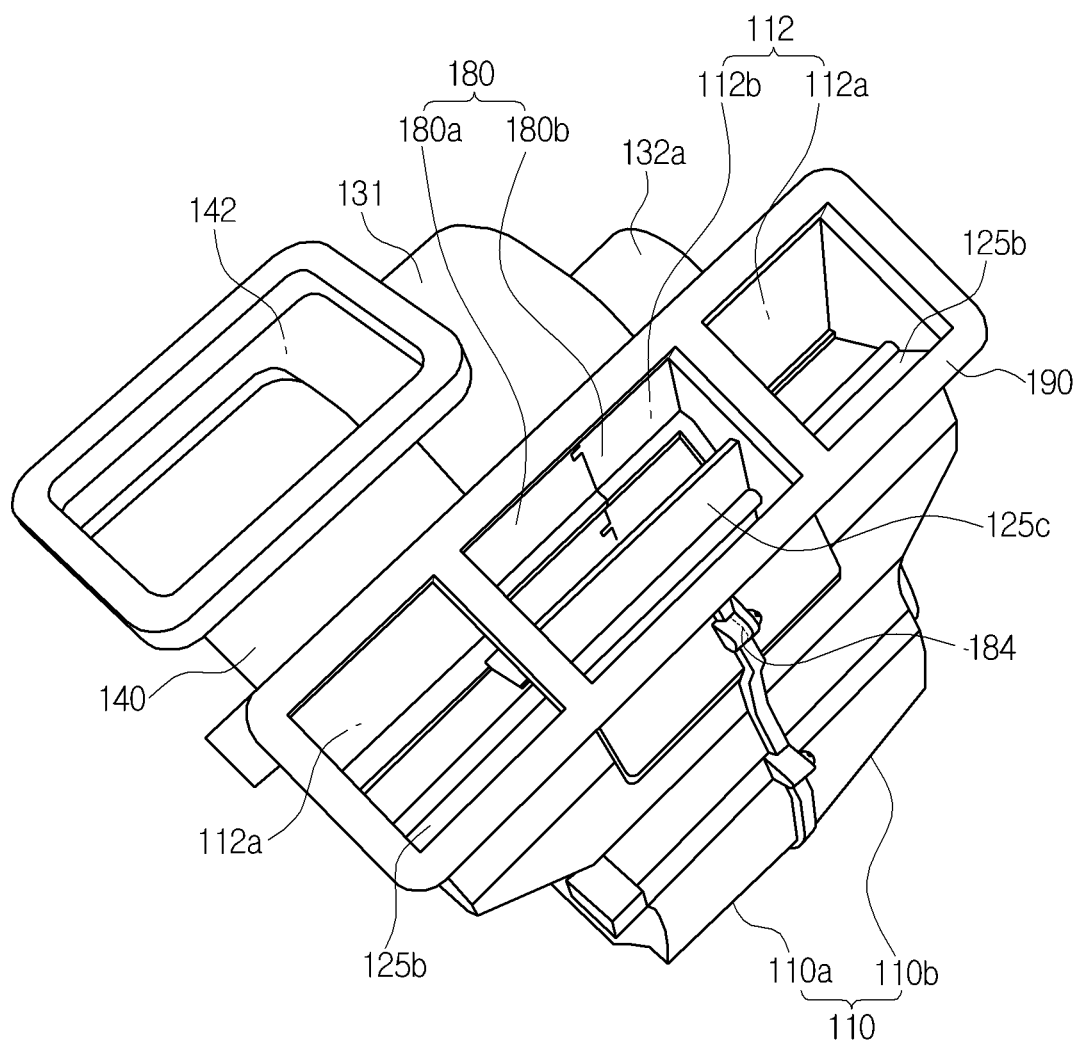
FIG. 5 is a top view in perspective showing the air conditioner for the vehicle according to the present invention.
Figure 6:
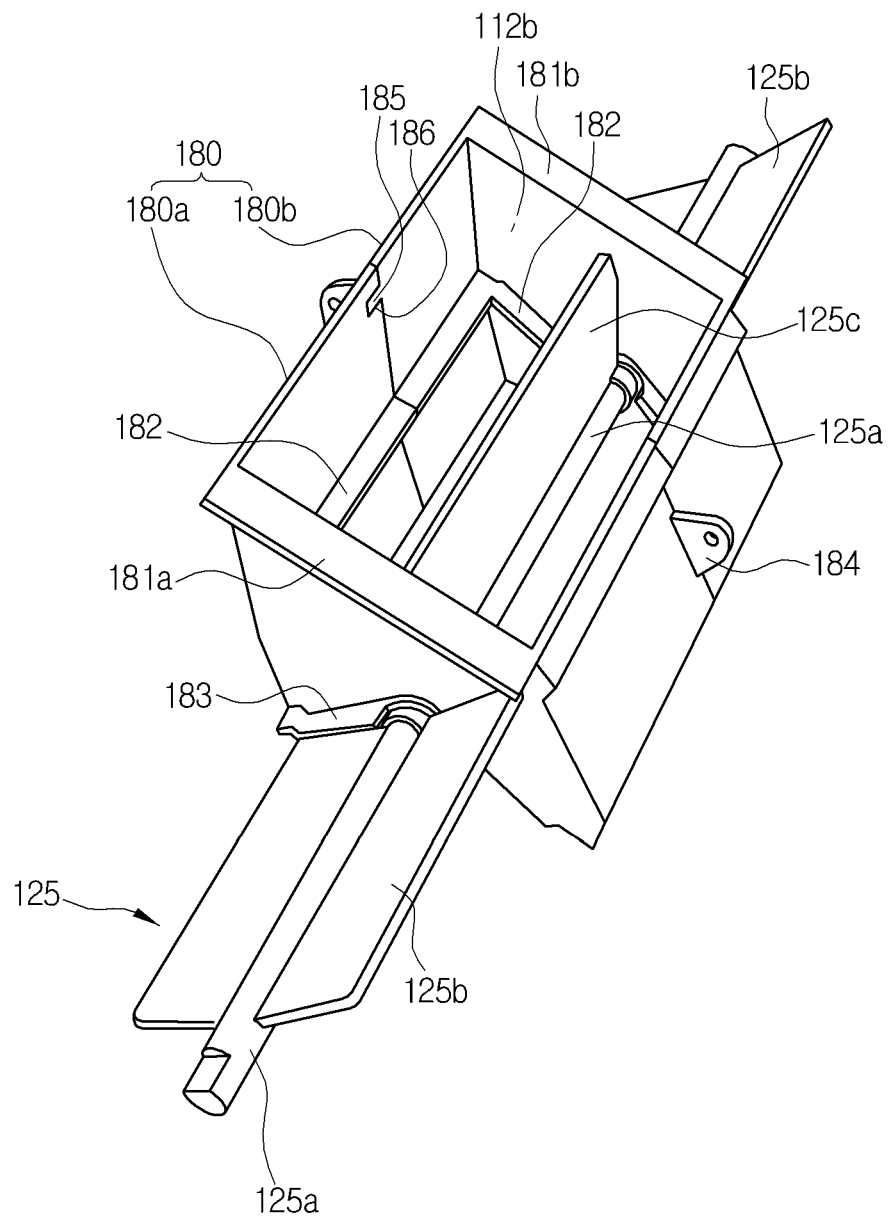
FIG. 6 is a perspective view showing a mode door assembled to a duct separator in the air conditioner for the vehicle according to the present invention.
Figure 7:
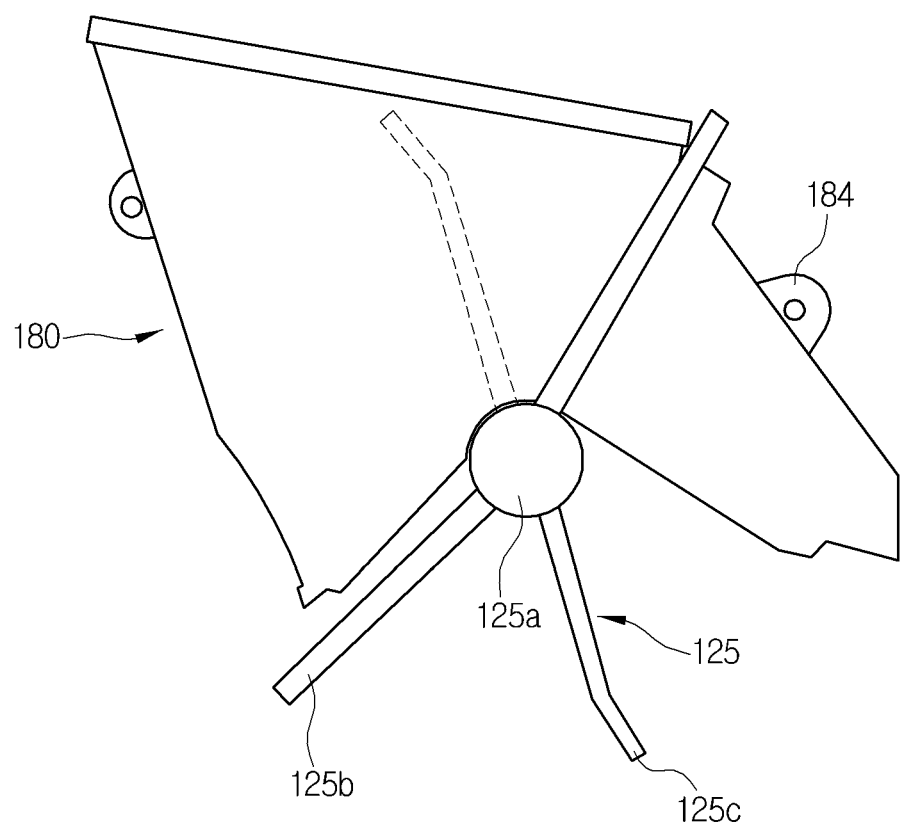
FIG. 7 is a side view of FIG. 6.

As shown in FIG. 4, the defrost vent 112b and the face vents 112a are formed in a straight line in the width direction of the vehicle.

That is, the defrost vent 112b is formed in the middle of the outlet 112 formed at the upper side of the air-conditioning case 110, and the face vents 112a are respectively formed at right and left sides of the defrost vent 112b.

Moreover, as shown in FIG. 4, the floor vent 112c may be formed at the lower side of the air-conditioning case 110, but may be changed in its position.

In the meantime, the face vents 112a blow air toward the face of a passenger who sits on the chair of the interior of the vehicle, and the floor vent 112c blows air toward the passenger's feet.

Furthermore, mode doors 125 and 126 are mounted at the outlet 112 of the air-conditioning case 110 in order to adjust the degree of opening of the outlet 112 according to air outflow mode.

Figure 15:
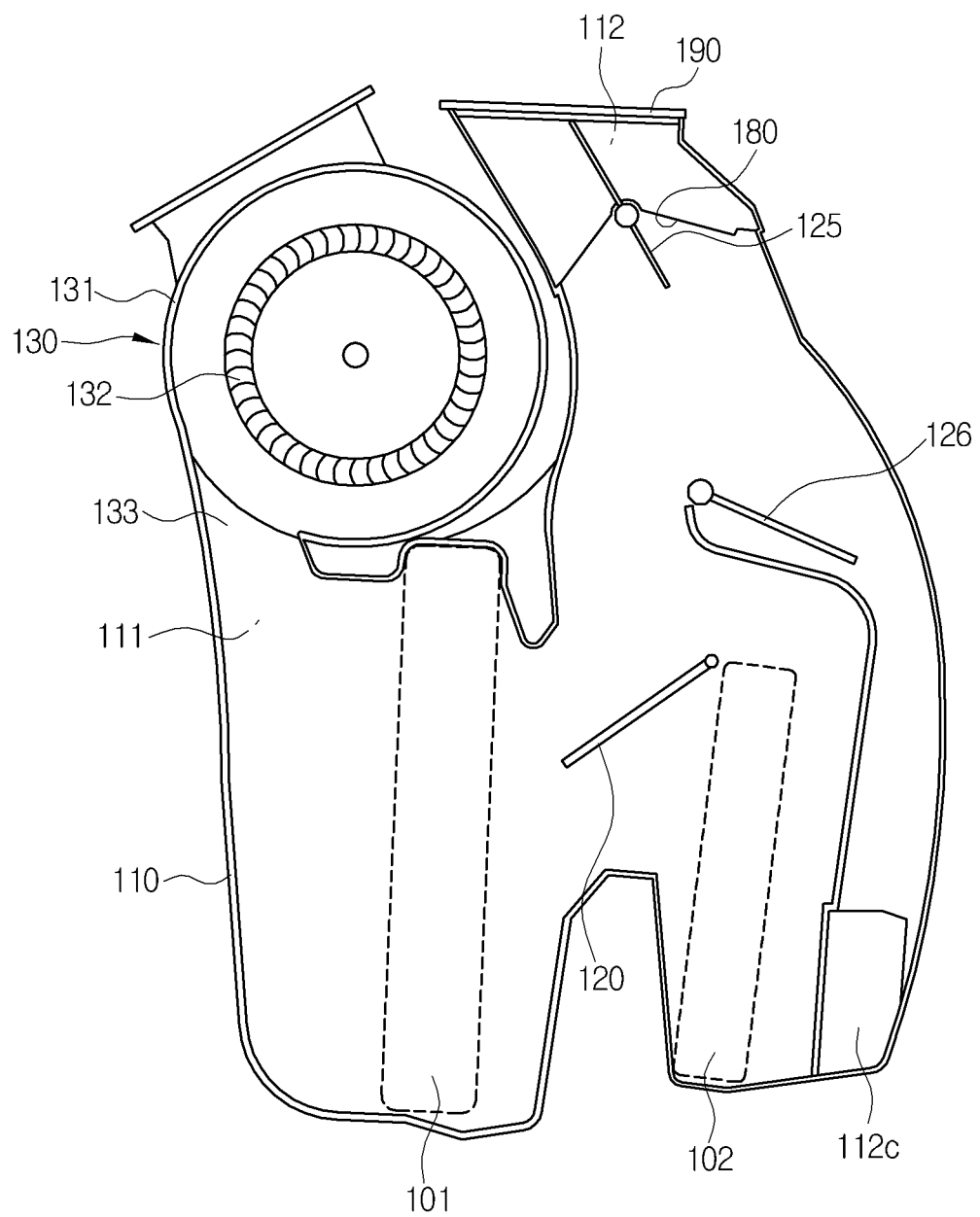
FIG. 15 is a sectional view of the air conditioner for the vehicle according to the present invention.

In other words, as shown in FIG. 15, one mode door 125 is mounted to adjust the degree of opening of the defrost vent 112b and the degree of opening of the face vents 112a, and the other mode door 126 is mounted to adjust the degree of opening of the floor vent 112c.

Figure 8:
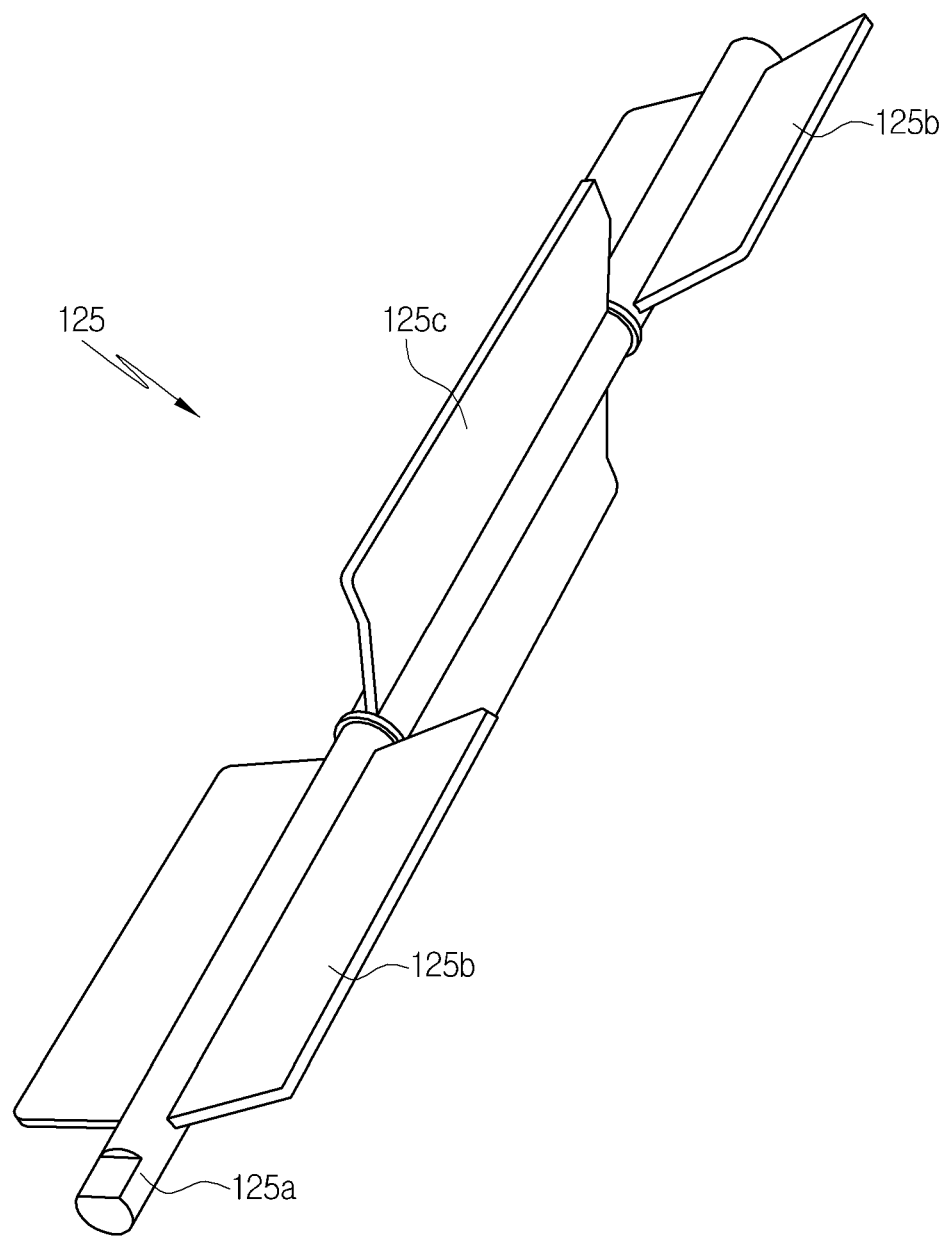
FIG. 8 is a perspective view showing the mode door of the air conditioner for the vehicle according to the present invention.

In this instance, as shown in FIG. 8, the mode door 125 for adjusting the degree of opening of the defrost vent 112b and the face vents 112a is a center pivot type door, and includes: a rotary shaft 125a rotatably mounted on the air-conditioning case 110; a defrost door part 125c arranged in the middle of the mode door 125 to adjust the degree of opening of the defrost vent 112b; and face door parts 125b respectively arranged at both end portions of the mode door to adjust the degree of opening of the face vents 112a.

The rotary shaft 125a of the mode door 125 is rotatably combined to side walls of the right and left cases 110a and 110b of the air-conditioning case 110.

Additionally, the mode door 125 may be formed in such a way that the defrost door part 125c and the face door parts 125b are formed integrally, but preferably, the mode door 125 is formed in such a way that the defrost door part 125c and the face door parts 125b are manufactured individually and the rotary shafts 125a of the door parts are connected with each other.

In case that the defrost door part 125c and the face door parts 125b are manufactured individually, the door parts are divided into three, namely, one face door part 125b and two defrost door parts 125c.

In the meantime, the defrost door part 125c and the face door part 125b are mounted in a straight line. That is, the rotary shaft 125a of the defrost door part 125c and the rotary shaft 125a of the face door part 125b are mounted coaxially.

In addition, the defrost door part 125c and the face door part 125b are mounted at different angles in the rotational direction of the rotary shafts 125a.

In other words, the mode door 125 does not simultaneously open and close the defrost vent 112b and the face vents 112a but controls opening and closing of the defrost vent 112b and the face vent 112a oppositely.

In this instance, angles of the defrost door part 125c and the face door part 125b are set in such a way that the face door part 125b closes the face vent 112a when the defrost door part 125c opens the defrost vent 112b and the face door part 125b opens the face vent 112a when the defrost door part 125c closes the defrost vent 112b.

As described above, a defrost mode and a face mode can be realized in such a way that the defrost vent 112b and the face vent 112a are selectively opened by one mode door 125.

In addition, a duct separator 180 which partitions the face vents 112a from the defrost vent 112b and in which one of the defrost door part 125c and the face door part 125b is arranged is disposed inside the inlet 112 at which the defrost vent 112b and the face vents 112a are formed.

The duct separator 180 is inserted in the middle of the outlet 112. The defrost vent 112b is formed inside the duct separator 180 and the face vents 112a are respectively formed at the right and the left of the outer face of the duct separator 180.

That is, the defrost vent 112b and the face vents 112a are partitioned by the duct separator 180 inserted into the outlet 112, and the defrost vent 112b is formed inside the duct separator 180 within the outlet 112 and the face vents 112a are formed at the right and left sides of the duct separator 180.

Accordingly, the defrost door 125c for opening and closing the defrost vent 112b is rotatably arranged inside the duct separator 180, and the face door parts 125b for opening and closing the face vents 112a are arranged at the right and left sides of the outer face of the duct separator 180 and is mounted concentrically with the rotary shaft 125a of the defrost door part 125c.

The rotary shaft 125a of the defrost door part 125c is arranged at a lower end side of the duct separator 180, and in this instance, a plate of the defrost door part 125c rotates inside the duct separator 180 and the other plate of the defrost door part 125c rotates under the duct separator 180.

The duct separator 180 includes: a left duct part 180a which has a left partition wall 181a to partition the defrost vent 112b and the left face vent 112a from each other; and a right duct part 180b which has a right partition wall 181b to partition the defrost vent 112b and the right face vent 112a from each other and is combined with the left duct part 180a.

That is, when the left duct part 180a and the right duct part 180b are assembled, the single duct separator 180 is made.

In the meantime, a protrusion 185 is formed on one of combined sides between the left duct part 180a and the right duct part 180b and a slot 186 is formed on the other combined side so that the protrusion 185 and the slot 186 are forcedly fit and combined to each other when the left duct part 180*a* and the right duct part 180*b* are combined together, so as to enhance assemblability.

Moreover, sealing walls 182 and 183, which come into contact with the defrost door part 125*c* or the face door part 125*b* when the defrost vent 112*b* or the face vent 112*a* is closed, are protrudingly formed on the lateral side of the duct separator 180.

That is, the sealing wall 182 which comes into contact with the defrost door part 125*c* to seal when the defrost vent 112*b* is closed is formed on the inner face of the duct separator 180. Furthermore, the sealing walls 183 which come into contact with the face door parts 125*b* to seal when the face vents 112*a* are closed are formed on the outer walls of the left and right partition walls 181*a* and 181*b* of the duct separator.

Additionally, the duct separator 180 further includes combining ribs 184 protrudingly formed on the outer face thereof. The combining ribs 184 are protrudingly formed between the combined sides of the left and right cases 110*a* and 110*b* and are combined with the left and right cases 110*a* and 110*b*.

The combining ribs 184 are protrudingly formed at combined portions of the left and right duct parts 180*a* and 180*b* and protrude between the combined sides of the left and right cases 110*a* and 110*b*.

Therefore, when the combined portions of the left and right cases 110*a* and 110*b* are combined with each other by a screw, the combining ribs 184 are also combined together by the screw.

In the meantime, a main housing 190 is seated and mounted on the upper side of the outlet 112 in which the defrost vent 112*b* and the face vent 112*a* are formed.

The main housing 190 includes a plurality of inner passageways divided corresponding to the number of the defrost vent 112*b* and the face vents 112*a*.

Moreover, the main housing 190 covers the upper sides of the left and right cases 110*a* and 110*b* and the upper side of the duct separator 180.

Furthermore, because the duct separator 180 is screw-assembled with the left and right cases 110*a* and 110*b* through the combining ribs 184, the duct separator 180 and the main housing 190 are easily assembled with each other to enhance adhesion.

Additionally, the evaporator 101 and the heater core 102 are mounted in an air passageway between the inlet 111 and the outlet 112 of the air-conditioning case 110 to be spaced apart from each other at a predetermined interval.

In addition, a temperature-adjusting door 120 is mounted between the evaporator 101 and the heater core 102 inside the air-conditioning case 110.

The temperature-adjusting door 120 adjusts the degree of opening of a passageway bypassing the heater core 102 and a passageway passing through the heater core 102 so as to adjust temperature by controlling a mixed amount of cold air bypassing the heater core 102 after passing the evaporator 101 and warm air passing through the heater core 102.

Moreover, the blower 130 includes: a scroll case 131 connected and disposed at the inlet 111 of the air-conditioning case 110; a centrifugal fan 132 rotatably mounted inside the scroll case 131; an intake duct 140 which is combined to one side of the scroll case 131 in an axial direction of the centrifugal fan 132 and has inside and outside air inflow ports 141 and 142 to induce inside air and outside air; and an intake door 150 which is rotatably mounted inside the intake duct 140 to open and close the inside and outside air inflow ports 141 and 142.

Such a blower 130 is mounted above the evaporator 101 of the air-conditioning case 110, and the scroll case 131 is formed integrally with the air-conditioning case 110.

Additionally, the intake duct 140 is combined to one side of the scroll case 131 and a motor 132*a* for operating the centrifugal fan 132 is combined to the other side of the scroll case 131.

Moreover, the intake duct 140 is formed in a cylindrical shape. One side of the cylindrical intake duct 140 in the axial direction is opened by a round opening 143, and the other side 144 is closed. Of course, the closed side 144 of the intake duct 140 has an air intake 145 which will be described later.

Furthermore, the opening 143 of the intake duct 140 is combined to the scroll case 131.

Additionally, the inside and outside air inflow ports 141 and 142 are formed on the outer circumferential surface of the intake duct 140 to be spaced apart from each other in the circumferential direction.

A pair of the inside air inflow ports 141 are formed on the outer circumferential surface of the intake duct 140 corresponding to positions of a pair of door plates 153*a* and 153*b*. Namely, two inside air inflow ports 141 are formed at an interval of 180 degrees.

One outside air inflow port 142 is formed on the outer circumferential surface of the intake duct 140, and in this instance, the outside air inflow port 142 is formed between a pair of the inside air inflow ports 141 on the outer circumferential surface of the intake duct 140.

In other words, the two inside air inflow ports 141 are formed in the direction of 180 degrees in the middle of the intake duct 140 and the one outside air inflow port 142 is formed in the direction of 90 degrees.

Therefore, when the centrifugal fan 132 of the blower 130 is operated, air is inhaled into the intake duct 140 through the inside and outside air inflow ports 141 and 142, and the inhaled air is discharged in the radial direction of the centrifugal fan 132 after being induced into the centrifugal fan 132. After that, the air is supplied to the inlet 111 of the air-conditioning case 110 through the outlet 133 of the blower 130.

In addition, a supporter 146 for rotatably supporting a rotary shaft 151*a* of one side of the intake door 150 is disposed on the inner circumferential surface of the opening 143 of the intake duct 140.

Accordingly, the rotary shaft 151*a* of the intake door 150 is rotatably combined to the supporter 146, and a rotary shaft 151*b* of the other side is rotatably combined to the closed side 144 of the intake duct 140.

The supporter 146 includes: a boss part 146*a* for rotatably supporting the rotary shaft 151*a* of one side of the intake door 150; and a plurality of connection ribs 146*b* for connecting the outer circumferential surface of the boss part 146*a* with the inner circumferential surface of the opening 143 of the intake duct 140.

Three plural connection ribs 146*b* are formed at an interval of 120 degrees, and in this instance, the boss part 146*a* is arranged to be spaced apart from the opening 143 of the intake duct 140 at a predetermined interval by the connection rib 146*b*.

Moreover, the intake door 150 is rotatably mounted inside the intake duct 140 and the rotary shafts 151*a* and 151*b* of the intake door 150 are mounted to be in the same direction with the rotary shaft of the centrifugal fan 132 so as to open and close the inside and outside air inflow ports 141 and 142.

The intake door 150 is a cylindrical door, and has an opening 154 formed on the outer circumferential surface of the cylindrical door part 153 to open and close the inside and outside air inflow ports 141 and 142 according to rotating angles.

In more detail, the intake door 150 includes: a pair of door plates 153a and 153b which are spaced apart from each other at a predetermined interval in the radial direction based on the rotary shafts 151a and 151b thereof to form the cylindrical door part 153; a support rib 152 which connects inner faces of the door plates 153a and 153b with each other and on which the rotary shaft 151a is formed; and a side plate 156 which connects end portions of the door plates 153a and 153b with each other and on which the other rotary shaft 151b is formed.

Each of the door plates 153a and 153b is formed in an arc shape.

Furthermore, the support rib 152 includes: a 'V'-shaped first rib 152a formed on the inner face of the door plates 153a and connected toward the rotary shaft 151a; and a 'V'-shaped second rib 152b formed on the inner face of the other door plate 153b and connected toward the rotary shaft 151a. The rotary shaft 151a axially protrudes at the portion where the first rib 152a and the second rib 152b meet together.

Additionally, the intake door 150 has the opening 154 formed between the door plates 153a and 153b in the circumferential direction.

Meanwhile, one end portion of each of the door plates 153a and 153b is supported by the side plate 156 to be connected, and the other end portion is supported by a reinforcing bar 158 to be connected.

In this instance, the reinforcing bar 158 is formed at the position spaced apart from the other end portion of the door plate at a predetermined interval.

Therefore, in an outside air inflow mode, the door plates 153a and 153b close the inside air inflow port 141 and the opening 154 opens the outside air inflow port 142 to make the outside air flow in. In an inside air inflow mode, one of the door plates 153a and 153b closes the outside air inflow port 142 and the opening 154 opens the inside air inflow port 141 to make the inside air flow in.

In the meantime, the intake duct 140 includes: an insertion groove 147 formed on the circumference of the opening 143 thereof; and a support protrusion 153c formed on the other end portions of the door plates 153a and 153b and rotatably inserted into the insertion groove 147 to be supported.

That is, end portions of the door plates 153a and 153b are connected with each other by the side plate 156 to be closed, but the other end portions of the door plates 153a and 153b are not connected with each other and are opened for a flow of air. Therefore, in case that the door plates 153a and 153b close the inside air inflow port 141 or the outside air inflow port 142, air may leak through the other end portions of the door plates 153a and 153b, but the support protrusion 153c formed on the other end portions of the door plates 153a and 153b is inserted into the insertion groove 147 formed on the circumference of the opening 143 of the intake duct 140 to prevent air leakage.

In addition, in the outside air inflow mode that the outside air inflow port 142 is opened by the intake door 150, inside air intake holes 145 and 157 are formed in the side 144 of the intake duct 140 and the side 156 of the intake door 150 so that inside air existing outside the intake duct 140 can be inhaled into the intake door 150.

The inside air intake hole 157 of the intake door 150 is formed to penetrate through the intake door 150, and the inside air intake hole 145 of the intake duct 140 is formed to penetrate through the side 144 of the intake duct 140 facing the side plate 156 of the intake door 150.

In this instance, two inside air intake hole 145 of the intake duct 140 are formed at 180 degrees based on the rotary shaft 151b of the intake door 150, and are formed corresponding to a pair of the inside air inflow ports 141.

In the meantime, the inside air intake holes 157 formed on the side plate 156 of the intake door 150 may be respectively formed in both side plates 156 based on the rotary shaft 151b or may be formed just in one side plate 156.

Therefore, in the outside air inflow mode, because the opening 154 of the intake door 150 opens the outside air inflow port 142 and the door plates 153a and 153b close the inside air inflow port 141, the side plate 156 which connects the door plates 153a and 153b with each other is located at the position where the inside air intake hole 145 of the intake duct 140 is closed. In this instance, while the inside air intake hole 157 formed in the side plate 156 and the inside air intake hole 145 formed in the side 144 of the intake duct 140 coincide with each other, the inside air intake holes 145 and 157 are opened, so that the inside air of a predetermined amount is inhaled through the inside air intake holes 145 and 157 even in the outside air inflow mode.

Meanwhile, in the outside air inflow mode, the inside air intake hole 157 formed in the side plate 156 and the inside air intake hole 145 formed in the side 144 of the intake duct 140 are opened while coinciding with each other, and in the inside air inflow mode, the inside air intake hole 145 is opened while the side plate 156 of the intake door 150 deviates from the inside air intake hole 145 of the intake duct 140.

As described above, because there is no need to add components to inhale the inside air in the outside air inflow mode, the air conditioner for the vehicle according to the present invention can reduce manufacturing processes and manufacturing costs and enhance cooling and heating performance by inhaling some of the inside air in the outside air inflow mode.

Moreover, the mode door 125 for adjusting the degree of opening of the face vent 112a and the degree of opening of the defrost vent 112b is operated by a first operating member 160 mounted on the outer face of the air-conditioning case 110.

The first operating member 160 includes: an arm 161 which is combined with the rotary shaft 125a of the mode door 125 and has a pin 161a at one end portion; and a cam 162 which is rotatably combined to the outer face of the air-conditioning case 110 and has a slot 162a so that the pin 161a of the arm 161 is combined slidably.

Therefore, when the cam 162 rotates at a predetermined angle, the arm 161 operates the mode door 125 while providing a cam motion along the shape of the slot 162a.

A control cable 165 is connected to the cam 162. When the passenger manipulates a controller in the interior of the vehicle, the manipulation force is transferred to the cam trough the control cable 165 so that the cam 162 is rotated.

Furthermore, the intake door 150 is operated through the second operating member 170 mounted on the outer face of the intake duct 140.

The second operating member 170 includes: a lever 172 which is rotatably combined to the side of the intake duct 140 and has a pin (not shown) at an end portion; and a cam 171 which is combined to the rotary shaft 151b of the intake door 150 and has a slot 171a so that the pin of the lever 172 can be slidably combined thereto.

When the passenger actuates the lever 172 of the second operating member 170, the cam 171 is operated. That is, when the lever 172 rotates at a predetermined angle, the cam 171 is also rotated at a predetermined angle while the pin of the lever 172 moves along the slot 171a, so that the intake door 150 is operated.

Meanwhile, as another embodiment of the second operating member 170, the positions of the cam 171 and the lever 172 can be changed in reverse. That is, the cam 171 is mounted at the position of the lever 172 and the lever 172 is mounted at the position of the cam 171.

Additionally, in the present invention, when one of the first operating member 160 and the second operating member 170 is operated, the other one is operated in interwork, and a connection member 175 for connecting the first operating member 160 and the second operating member 170 with each other is disposed.

The connection member 175 is mounted to connect the cam 162 of the first operating member 160 with the lever 172 of the second operating member 170. Therefore, when the cam 162 of the first operating member 160 is rotated, the lever 172 of the second operating member 170 is operated in interwork.

In addition, the cam 162 of the first operating member 160 includes: a first lever 162b to which the connection member 175 is connected; and a second lever 162c to which the control cable 165 for operating the cam 162 is connected.

That is, one end portion of the connection member 175 is rotatably combined to an end portion of the first lever 162b, and the other end portion of the connection member 175 is rotatably combined to the lever 172 of the second operating member 170.

In this instance, the other end portion of the connection member 175 is rotatably combined to a longitudinal central point of the lever 172, but the position may be changed. In other words, the other end portion of the connection member 175 may be combined to one of various positions of the lever 172 and also combined to the cam 171 of the second operating member 170.

In the meantime, the control cable 165 is rotatably combined to an end portion of the second lever 162c.

Figure 11:
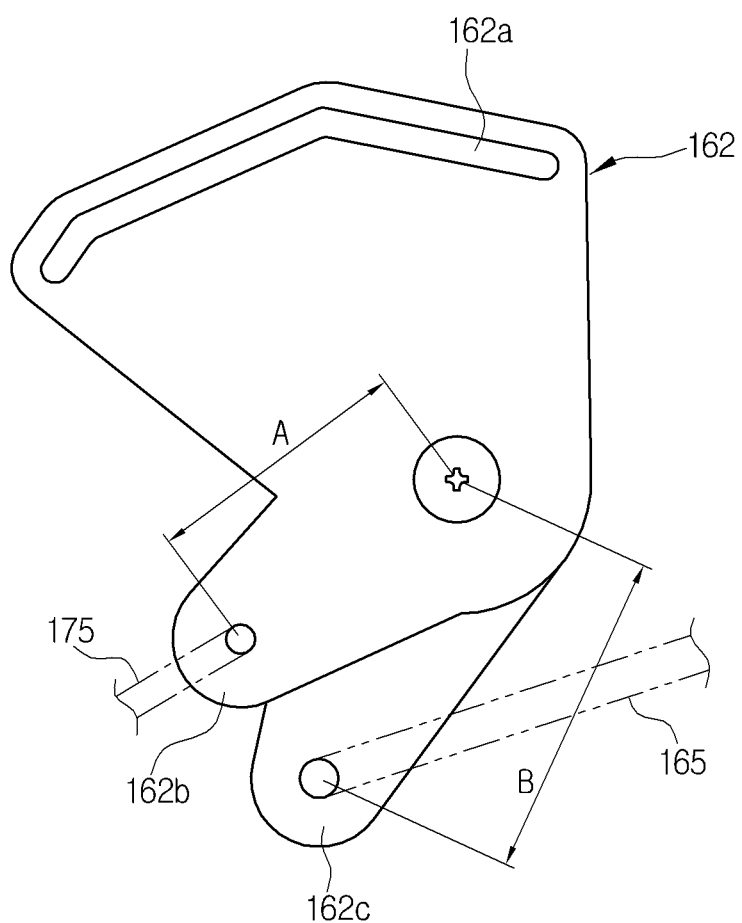
FIG. 11 is a view showing a cam of the first operating member of the air conditioner for the vehicle according to the present invention.
Figure 12:
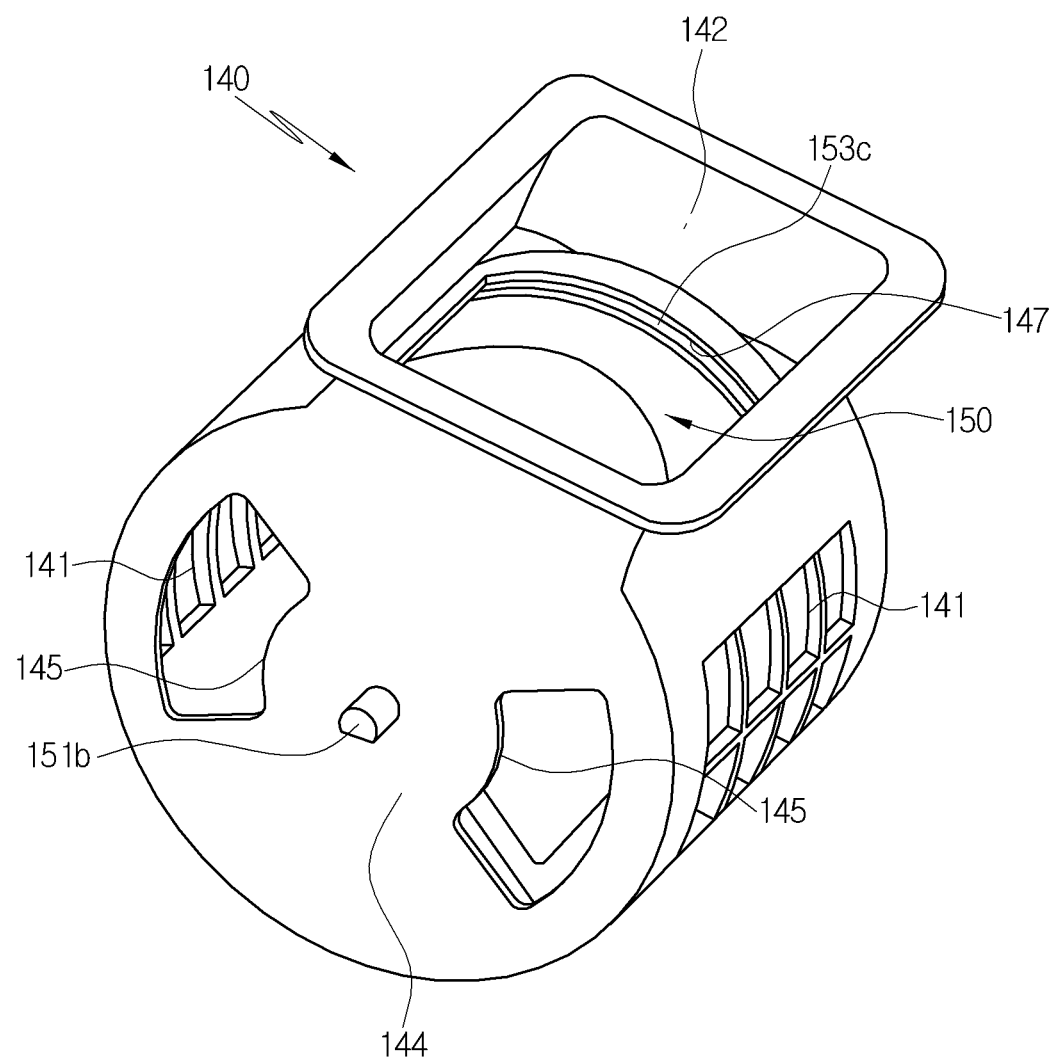
FIG. 12 is a perspective view showing an intake duct of the air conditioner for the vehicle according to the present invention.
Figure 13:
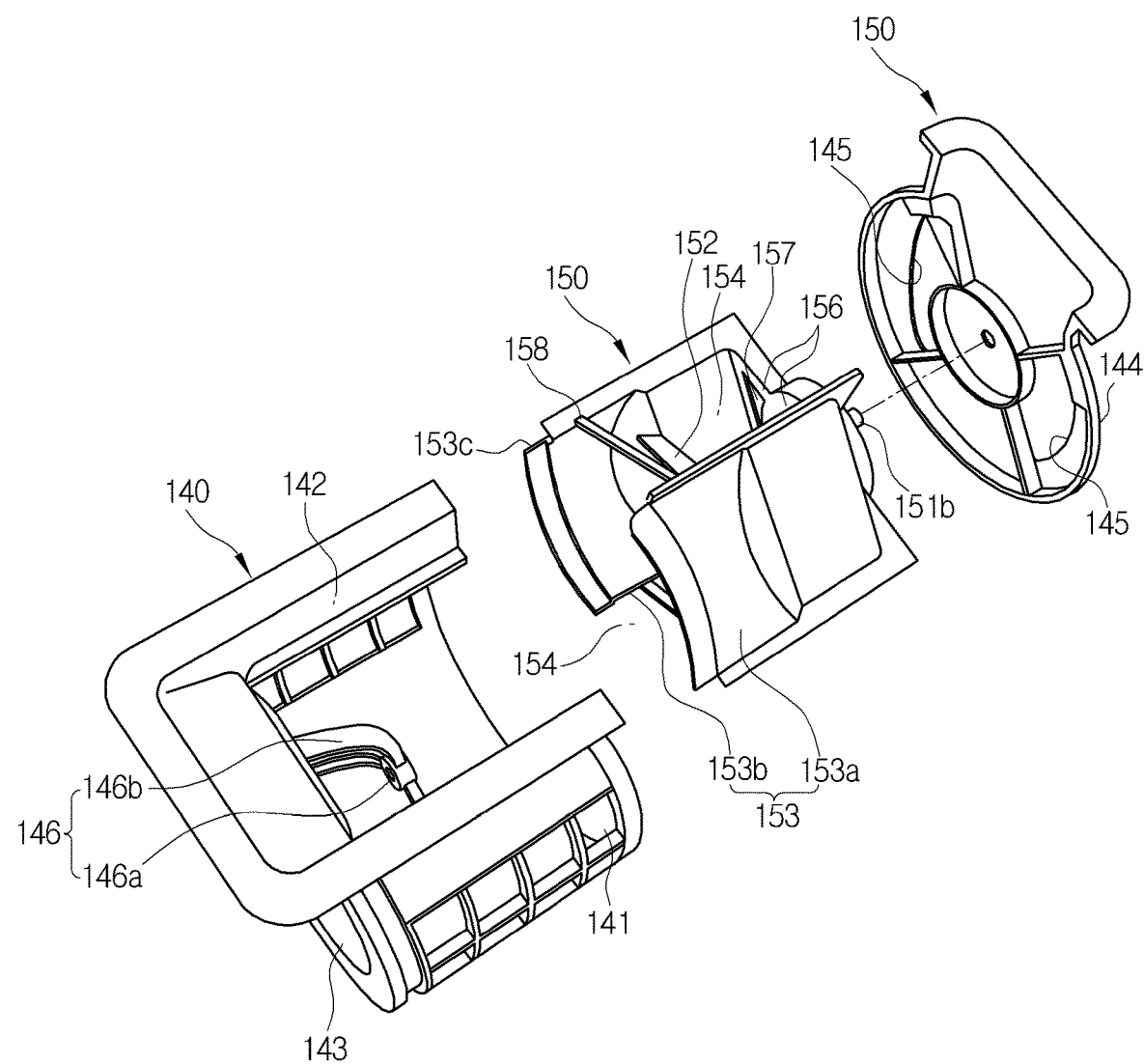
FIG. 13 is an exploded perspective view showing the intake duct and an intake door of the air conditioner for the vehicle according to the present invention.
Figure 14:
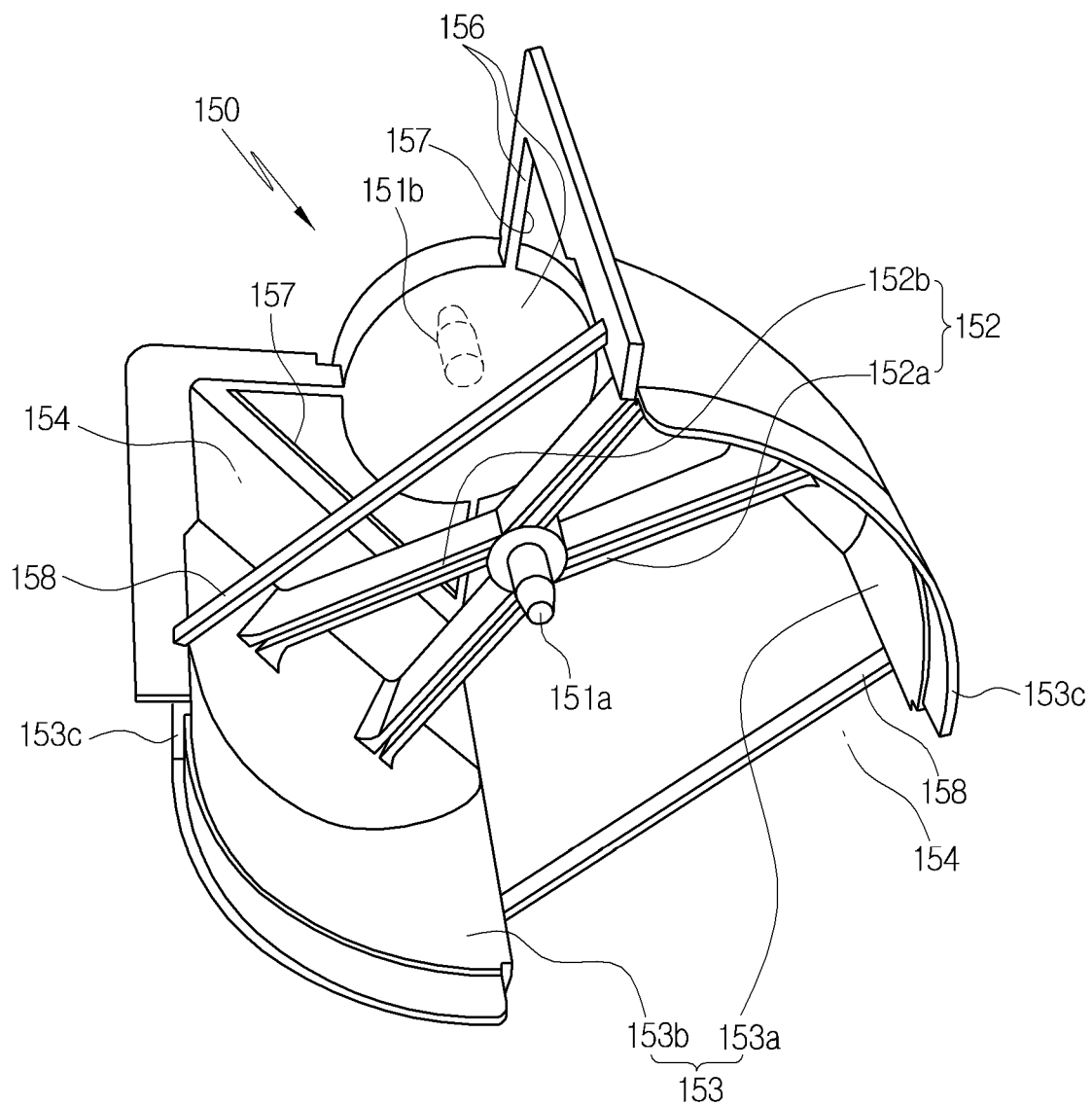
FIG. 14 is a perspective view showing the intake door of the air conditioner for the vehicle according to the present invention.

Moreover, as shown in FIG. 11, a radial length (A) of the first lever 162b from the center of rotation of the cam 162 is shorter than a radial length (B) of the second lever 162c. Here, the radial length (A) of the first lever 162b is the length from the center of rotation of the cam 162 to a connection point of the connection member 175 of the first lever 162b, and the radial length (B) of the second lever 162c is the length from the center of rotation of the cam 162 to a control cable connection point of the second lever 162c.

In other words, because the connection point of the connection member 175 connected to the first lever 162b is closer to the center of rotation of the cam 162 than the control cable connection point connected to the second lever 162c, when the control cable 165 is manipulated, stronger torque is generated so as to increase power transferred to the lever 172 of the second operating member 170 through the connection member 175, so that the passenger can manipulate easily.

Meanwhile, preferably, the second operating member 170 mounted on the intake duct 140 is mounted at a position deviated from the inside air intake hole 145 of the intake duct 140.

Furthermore, the connection member 175 connects the first operating member 160 and the second operating member 170 with each other to control them to interwork, so that the air conditioner for the vehicle according to the present invention can control the air outflow mode and the air inflow mode to interwork.

The air outflow mode has a face mode, a defrost mode and a floor mode, and the air inflow mode has the inside air inflow mode and the outside air inflow mode.

Figure 10:
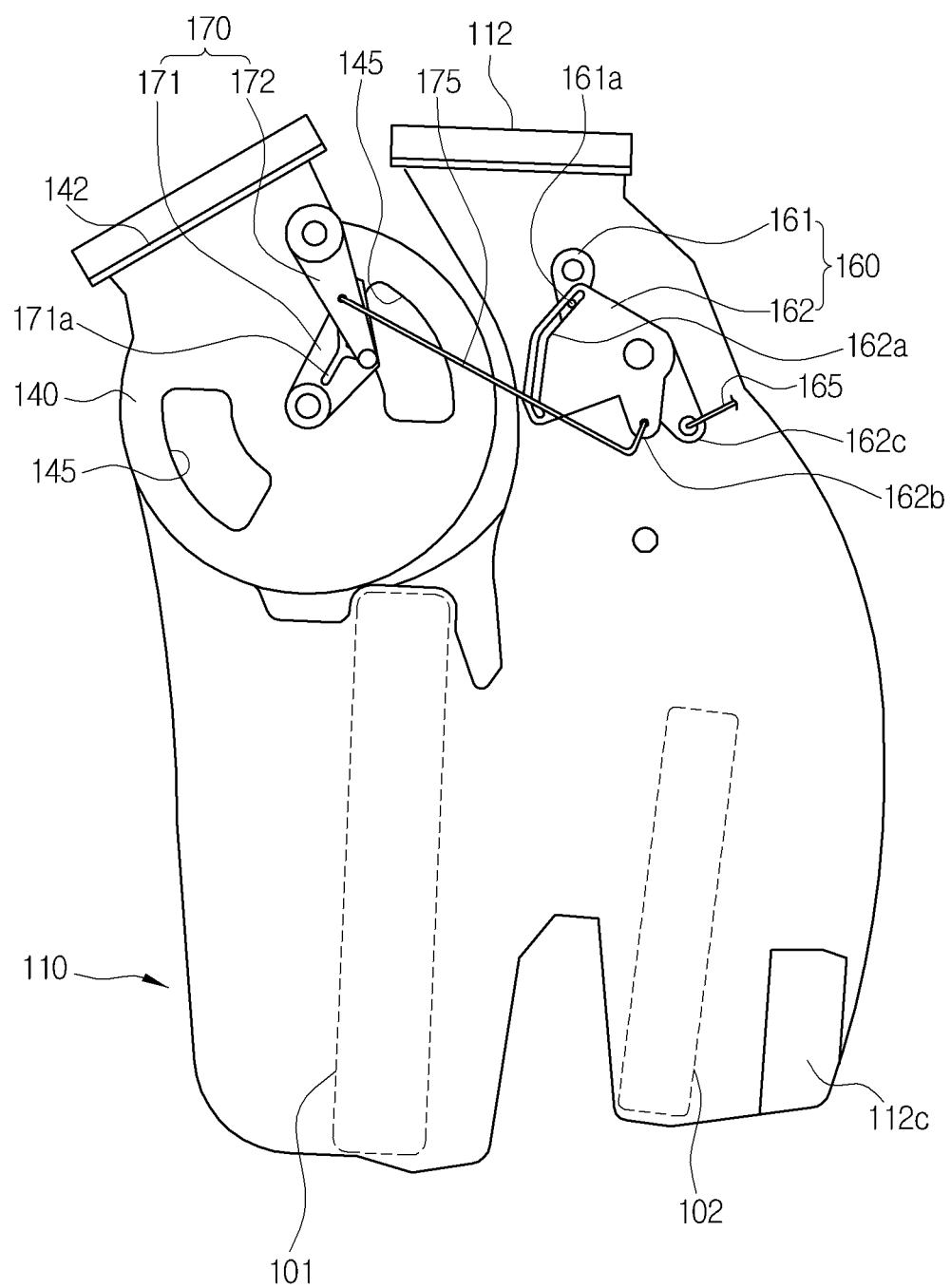
FIG. 10 is a side view showing operating states of the first and second operating members in a face mode and in an inside air inflow mode of the air conditioner for the vehicle according to the present invention.

When the air conditioner for the vehicle according to the present invention controls the air outflow mode and the air inflow mode to interwork, the face mode of the air outflow mode, which opens the face vents 112a, interworks with the inside air inflow mode of the air inflow mode, which opens the inside air inflow port 141 (See FIG. 10).

Figure 9:
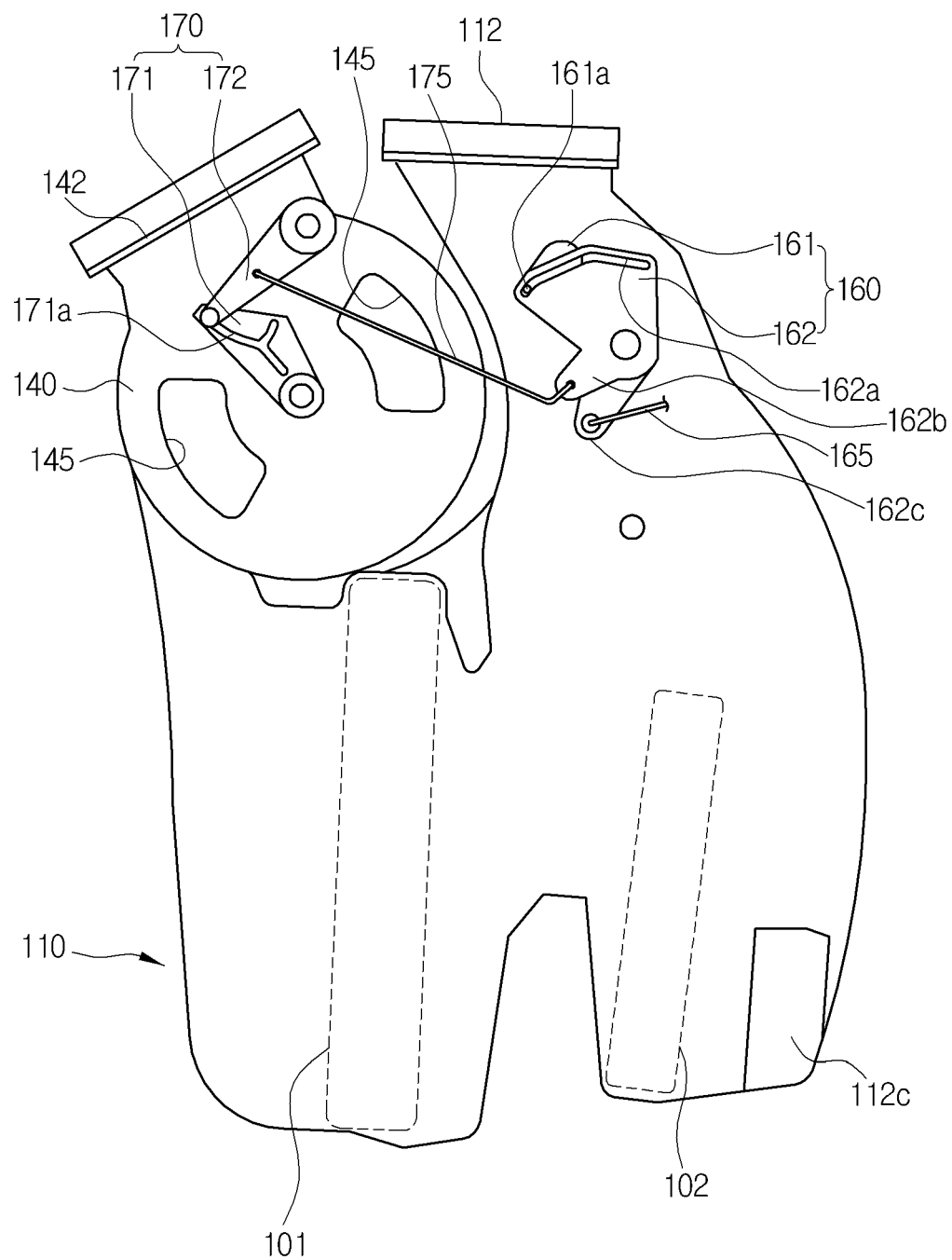
FIG. 9 is a side view showing operating states of first and second operating members in a defrost mode and in an outside air inflow mode of the air conditioner for the vehicle according to the present invention.

The air conditioner controls the first and second operating members 160 and 170 to interwork so that the defrost mode of the air outflow mode, which opens the defrost vent 112b, interworks with the outside air inflow mode of the air inflow mode, which opens the outside air inflow port 142 (See FIG. 9).

In other words, because the first and second operating members 160 and 170 are operated in interwork through the connection member 175, when the first operating member 160 is operated to realize the face mode by the mode door 125, the second operating member 170 is also operated in interwork with the first operating member 160 to realize the inside air inflow mode by the intake door 150.

Furthermore, when the first operating member 160 is operated to realize the defrost mode by the mode door 125, the second operating member 170 is also operated in interwork with the first operating member 160 to realize the outside air inflow mode by the intake door 150.

As described above, because the connection member 175 connects the first operating member 160, which operates the mode door, and the second operating member 170, which operates the intake door 150, to control them in interwork, the two doors can be manipulated at the same time by just one control cable 165. Therefore, the air conditioner for the vehicle according to the present invention can reduce the number of manipulations by the passenger to realize a wanted mode, reduce the number of the components by reducing the number of the control cable 165, and control the air outflow mode and the air inflow mode in interwork.

Hereinafter, actions of the air conditioner for the vehicle according to the present invention will be described.

In this specification, just an assembling process of the duct separator 180 which is distinguished from the components of the conventional air conditioners will be described.

First, after the left and right duct parts 180a and 180b of the duct separator 180 are assembled, the defrost door part 125c is arranged inside the duct separator 180. Alternatively, after the defrost door part 125c is first arranged, the left and right duct parts 180a and 180b are assembled with each other at the left and right sides of the defrost door part 125c.

After that, at the right and left sides of the duct separator 180, the rotary shafts 125a of the face door parts 125b are respectively combined to both ends of the rotary shaft 125a of the defrost door part 125c.

Continuously, the left and right cases 110a and 110b are assembled with each other between the assembled duct separator 180 and the mode door 125.

Next, an operating process of the air conditioner will be described.

First, when the centrifugal fan 132 is operated by operation of the motor 132a, low pressure is formed inside the centrifugal fan 132 by the rotation of the centrifugal fan 132, so that inside air or outside air is inhaled into the intake duct 140 through the inside air inflow port 141 or the outside air inflow port 142 opened by the intake door 150. The inhaled air passes the inside of the intake door 150, flows to the inside of the centrifugal fan 132, and then, is blown in the radial direction of the centrifugal fan 132.

Here, in the inside air inflow mode interworking with the face mode, the intake door 150 closes the outside air inflow port 142 but opens the inside air inflow port 141 and opens the inside air intake hole 145 of the intake duct 140, so that just the inside air flows in through the inside air inflow port 141 and the inside air intake hole 145.

In the outside air inflow mode interworking with the defrost mode, the intake door 150 closes the inside air inflow port 141 but opens the outside air inflow port 142, and the inside air intake hole 145 of the intake duct 140 and the inside air intake hole 157 of the intake door 150 are also opened, so that outside air is induced through the outside air inflow port 142 and the inside air is also induced through the inside air intake holes 145 and 157. In this instance, the outside air is inhaled at the rate of about 70% and the inside air is inhaled at the rate of about 30%.

Continuously, the air blown in the radial direction of the centrifugal fan 132 is blown to the inside of the air-conditioning case 110 while moving along the inside of the scroll case 131.

The air blown to the inside of the air-conditioning case 110 is selectively cooled while passing the evaporator 101 according to heating or cooling modes, and then, flows in a cold air state by bypassing the heater core 102 by the temperature-adjusting door 120 or flows in a warm air state while passing through the heater core 102.

The air changed into warm air or cold air is discharged to the interior of the vehicle through the outlet 112 opened through the mode door 125 so as to cool or heat the interior of the vehicle.

When the passenger manipulates the controller inside the vehicle in order to change the air outflow mode, the first operating member 160 and the second operating member 170 interwork by the connection member 175. Therefore, when the passenger changes the air outflow mode into the face mode, the air inflow mode is changed into the inside air inflow mode in interwork, but when the passenger changes the air outflow mode into the defrost mode, the air inflow mode is changed into the outside air inflow mode in interwork.

What is claimed is:

1. An air conditioner for a vehicle which includes:
an air-conditioning case having an outlet having a defrost vent and a pair of face vents on opposing sides of the defrost vent to discharge air induced from a blower; and
a mode door mounted inside the air-conditioning case to adjust a degree of opening of the outlet;
wherein the defrost vent and the pair of face vents are formed in a straight line in a width direction of the vehicle;
wherein the mode door includes a defrost door part to adjust a degree of opening of the defrost vent and a pair of face door parts disposed in a straight line, with the face door parts on opposing sides of the defrost door part to adjust a degree of opening of the face vents;
wherein a duct separator which partitions the defrost vent and the face vents from each other and in which one of the defrost door part and the face door parts is arranged is disposed inside the outlet at which the defrost vent and the face vents are formed;
wherein the duct separator is inserted into a middle of the outlet;
wherein the defrost door part is rotatably arranged inside the duct separator, and wherein the face door parts are respectively arranged at right and left sides of an outer face of the duct separator in such a way as to be mounted concentrically with a rotary shaft of the defrost door part,
wherein the rotary shaft of the defrost door part is arranged at a lower end side of the duct separator, and wherein a first plate of the defrost door part rotates inside the duct separator and a second plate of the defrost door part rotates under the duct separator; and
wherein the duct separator includes a left duct part which has a left partition wall to partition the defrost vent and one of the pair of face vents from each other, and a right duct part which has a right partition wall to partition the defrost vent and the other of the par of face vents, and wherein the left duct part is coupled with the right duct part.

2. The air conditioner according to claim 1, wherein the defrost door part and the face door parts are mounted at different angles from each other in a rotational direction.

3. The air conditioner according to claim 1, wherein sealing walls which come into contact with the defrost door part or the face door part when the defrost vent or the face vent is closed are protrudingly formed on the side of the duct separator.

4. The air conditioner according to claim 1, wherein a protrusion is formed on one of combined sides between the left duct part and the right duct part and a slot is formed on the other of the combined sides so that the protrusion and the slot are combined together when the left duct part and the right duct part are combined together.

5. The air conditioner according to claim 1, wherein the air-conditioning case is formed in such a way that the left case and the right case are combined with each other, and
wherein a combining rib which is protrudingly formed between the combined sides of the left and right cases to be combined with the left and right cases is disposed on the outer face of the duct separator.

6. The air conditioner according to claim 1, wherein the outlet of the air-conditioning case includes: a defrost vent and face vents formed at an upper side of the air-conditioning case; and a floor vent formed at a lower side of the air-conditioning case.

7. The air conditioner according to claim 1, wherein the blower includes:
a scroll case connected to the inlet of the air-conditioning case;
a centrifugal fan rotatably mounted inside the scroll case;
an intake duct which is combined to one side of the scroll case in an axial direction of the centrifugal fan and has inside and outside air inflow ports to induce inside air and outside air; and
an intake door which is rotatably mounted inside the intake duct to open and close the inside and outside air inflow ports.

8. The air conditioner according to claim 7, wherein a first operating member is mounted on the outer face of the air-conditioning case to operate the mode door,
wherein a second operating member is mounted on the outer face of the intake duct to operate the intake door, and
wherein a connection member which connects the first operating member and the second operating member with each other is mounted to operate the first operating member and the second operating member in interwork in such a way that when one of the operating members is operated, the other one is also operated in interwork.

9. The air conditioner according to claim 8, wherein the first operating member includes:
   an arm which is combined with the rotary shaft of the mode door and has a pin at one end portion; and
   a cam which is rotatably combined to the outer face of the air-conditioning case and has a slot so that the pin of the arm is combined slidably.

10. The air conditioner according to claim 9, wherein the second operating member includes:
    a lever which is rotatably combined to the side of the intake duct and has a pin disposed at an end portion; and
    a cam which is combined to the rotary shaft of the intake door and has a slot so that the pin of the lever can be slidably combined thereto.

11. The air conditioner according to claim 10, wherein the connection member is mounted to connect the cam of the first operating member with the lever of the second operating member so that the lever of the second operating member is operated in interwork when the cam of the first operating member is operated to rotate.

12. The air conditioner according to claim 11, wherein the cam of the first operating member includes: a first lever to which the connection member is connected; and a second lever to which a control cable for operating the cam is connected.

13. The air conditioner according to claim 12, wherein a radial length of the first lever from the center of rotation of the cam is shorter than a radial length of the second lever.

14. The air conditioner according to claim 8, wherein the intake duct is formed in a cylindrical shape, and includes an opening formed at one side to be combined to the scroll case and the inside and outside air inflow ports formed on the outer circumferential surface to be spaced apart from each other in the circumferential direction, and
    wherein the intake door has an opening formed on the outer circumferential surface of a cylindrical door part to open and close the inside and outside air inflow ports according to rotating angles.

15. The air conditioner according to claim 14, wherein in the outside air inflow mode that the outside air inflow port is opened by the intake door, inside air intake holes are formed in the side of the intake duct and the side of the intake door so that inside air existing outside the intake duct can be inhaled into the intake door, and
    wherein the second operating member mounted on the intake duct is mounted at a position deviated from the inside air intake hole of the intake duct.

16. A method for controlling an air conditioner, comprising:
    providing an air conditioner according to claim 8;
    moving the first operating member to open the face vents with the mode door at the same time as moving the second operating member to open the inside air inflow port with the intake door; and
    moving the first operating member to open the defrost vent with the mode door at the same time as moving the second operating member to open air inflow port with the intake door.

* * * * *